United States Patent [19]

Aulbaugh et al.

[11] Patent Number: 5,628,969

[45] Date of Patent: May 13, 1997

[54] CHEMICAL SEPARATION AND REACTION APPARATUS

[75] Inventors: Randy Aulbaugh, Irving; Gregory G. Hawk, Coppell, both of Tex.

[73] Assignee: Mercury Treatment Alternatives, Inc., Carrollton, Tex.

[21] Appl. No.: 544,602

[22] Filed: Oct. 18, 1995

[51] Int. Cl.$^6$ ............................... B01J 8/04; B01D 11/02
[52] U.S. Cl. .................... 422/190; 422/258; 422/259; 422/268; 422/273; 422/288; 159/11.1; 702/238
[58] Field of Search ........................... 422/190, 258, 422/259, 273, 269, 288; 159/11.1; 202/238

[56] References Cited

U.S. PATENT DOCUMENTS

| | | | |
|---|---|---|---|
| 4,053,006 | 10/1977 | Tkac et al. | 159/6 W |
| 4,114,903 | 9/1978 | Bovio et al. | 277/81 R |
| 4,268,306 | 5/1981 | Björkman | 75/81 |
| 4,304,609 | 12/1981 | Morris | 134/19 |
| 4,340,477 | 7/1982 | Hobson, Jr. et al. | 210/241 |
| 4,670,104 | 6/1987 | Taylor | 202/84 |
| 5,183,499 | 2/1993 | Chintis | 75/742 |
| 5,227,026 | 7/1993 | Hogan | 202/117 |
| 5,244,492 | 9/1993 | Cyr | 75/742 |
| 5,253,597 | 10/1993 | Swanstrom et al. | 110/346 |
| 5,300,137 | 4/1994 | Weyand et al. | 75/670 |
| 5,453,562 | 9/1995 | Swanstrom et al. | 588/1 |
| 5,490,907 | 2/1996 | Weinworm et al. | 203/29 |

FOREIGN PATENT DOCUMENTS

| | | |
|---|---|---|
| WO91/13948 | 9/1991 | European Pat. Off. . |
| WO94/15150 | 7/1994 | European Pat. Off. . |

OTHER PUBLICATIONS

"Thermal Tratment Technologies for Haz Waste Remedies"—*Pollution Engineering*, Oct., 1989, vol. XXI, No. 11.

"Mass Transfer of hazardous Organic Compounds in Soil Matrices Experiment and Model"—*Combust. Sci. and Tech.*, 1992, vol. 85, pp. 151–163.

"Mass Transfer Studies Related to Thermal Adsorption–Desorption of Benzene and Chlorobenzene on Soil Matrices"—*Hazardous Waste & Hazardous Materials*, vol. 11, No. 1, 1994.

Chapter 5 entitled "Low–Temperature Transportable Technology for On–Site Remediation"—authors: Michael G. Cosmos and Roger K. Nielson for *Environmental Remediation*.

"Thermal Desorption of Organic Contaminants from Sand and Soil Using a Continuous Feed Rotary Kiln" authored by: Hsien–Tsung Chern, Lev N. Krasnoperov and Joseph W. Bozzelli.

"Volability of ICDD and PCB from Soil" authored by G. Edulgee.

*Primary Examiner*—Nina Bhat
*Attorney, Agent, or Firm*—Sullivan & Worcester LLP

[57] ABSTRACT

The present invention is an apparatus for use in the separation of volatile from non-volatile substances, separation of volatile substances, one from the other, and for performing various chemical reactions and, in particular, to an apparatus which performs these functions utilizing a combination of above ambient temperatures and above one inch of mercury vacuum within a rotating vessel fitted with or without an internal filter through which exiting gases and vapors must pass. Because of the compactness allowed by the present invention, the apparatus can also be configured to operate in a self contained mobile mode.

20 Claims, 2 Drawing Sheets

CHEMICAL SEPARATION AND REACTION APPARATUS

TECHNICAL FIELD OF THE INVENTION

The present invention relates to an apparatus for use in the separation of volatile from non-volatile substances, separation of volatile substances, one from another, and for performing various chemical reactions and, in particular, to an apparatus to perform these functions utilizing a combination of above ambient temperatures and above one inch of mercury vacuum within a rotating vessel fitted with or without an internal filter through which exiting gases and vapors must pass. Because of the compactness allowed by the present invention, the apparatus can also be configured to operate in a self-contained mobile mode.

BACKGROUND AND HISTORY

Various thermal treatment systems have been and continue to be used to separate volatile from non-volatile substances. For example, thermal desorption units are commonly used to remove substances such as mercury and volatile organics from soil and other solids. These prior art systems use heated rotating or non-rotating vessels operated under slight vacuums of less than 1 inch of mercury in the rotating systems to high vacuums of over 28 inches high in the non-rotating systems. The slight vacuum employed in rotating systems is to prevent leakage of environmentally-regulated substances out of the retort and off-gas treatment system, while the high vacuum in non-rotating systems serves to shorten process times. Although the technology is well known, there are several drawbacks and limitations which are overcome with the current invention.

First, in the prior art rotating systems, the off-gas treatment equipment, which is required to remove contaminated particulates and regulated chemicals prior to discharge of the treated gases to the atmosphere, is very large and expensive compared to the system's processing rate. Due to ever more stringent air emission regulations and the need to protect human health and the environment, these off-gas treatment systems will continue to become more sophisticated and costly. One of the primary reasons that the off-gas processing systems associated with prior art thermal units are so large and expensive is because of the high volume of carry out of contaminated particulates and combustion, sweep and/or leakage gases exhausted from the retort during operation. To reduce the size and complexity of the off-gas treatment systems, indirectly fired retort vessels are used.

Heat is usually applied to the outside of the retort or applied with resistance heaters inside of the retort. These systems reduce the amount of particulates and eliminate the combustion gases exiting the retort. The prior art systems, however, do not eliminate the carry out of particulates from the retort and they still require a relatively large amount of sweep gas to move the vaporizing chemicals out of the retort. Therefore, even though an improvement, prior art indirectly fired retorts still require relatively large and expensive off-gas treatment systems.

In the present invention, however, the combination of a substantial vacuum ranging from 1 to 29+inches of mercury and an internal filter virtually eliminates carry out of particulates and minimizes the need for sweep gases to move the vaporized substances out of the retort. The substantial vacuum of the present invention provides at least the following two benefits. One; it minimizes the suspension of fine particulates within the retort thereby minimizing the dust loading to the internal filter and two; it establishes a pressure gradient to assist in the diffusion of gases out of the retort. The amount of particulates and sweep gases exhausted from the retort is thereby reduced to the lowest practical level achievable. The dramatic reduction in off-gas treatment equipment size, complexity and cost is a significant improvement over prior art technology.

Additionally, there are many cases in which one or more of the components of the matrix and/or the substances to be separated are thermally sensitive. That is, one or more of the substances break down to unwanted substances and/or the structure of one or more matrix components are altered in a way that adversely affects subsequent treatment or reuse. Prior art systems employing heat and vacuum can be used for these situations. The use of vacuum lowers the boiling point of substances and, depending upon the substances involved, may allow the separation of chemicals at below critical temperatures. However, prior art systems that use above ambient temperature and substantial vacuum do not rotate and are therefore small batch systems requiring long process times. Prior art systems do not use rotation in combination with high temperature and substantial vacuum because of difficulties with sealing a hot rotating vessel under those conditions. Inadequate seals allow uncontrolled amounts of air to flow into the retort resulting in carry out of particulates and adding to the off-gas treatment requirements. To overcome the low processing rates of the prior art systems, the present invention employs a heated rotating vessel operating under a significant vacuum.

Rotation increases the processing rate by improving heat transfer to the process material, minimizing the path length the volatilized substances have to travel to exit the retort and minimizing the interference caused by collisions between the volatilized substances and particulates prior to exiting the retort. The present invention overcomes the problem of sealing a heated rotating vessel under substantial vacuum through the use of a uniquely designed rotating sleeve and externally mounted seal configuration that allows the seals to be easily cooled and maintained below the maximum operating temperature of the seal.

Another problem associated with the prior art systems is that the common materials available for construction of the retort limit the maximum operating temperature of an indirectly fired unit. Therefore, substances with boiling points above these temperature limits can not be rapidly volatilized within these units but must be processed using expensive internally heated refractory lined units. In the present invention, however, the use of a high vacuum within a rotating vessel lowers the boiling point of substances up to several hundred degrees Fahrenheit. This improvement allows the present invention to volatilize materials with high boiling points at a lower cost than has been possible using the prior art.

Finally, cleanup levels at contaminated sites are often dictated by the best available demonstrated technology. Often, if acceptable cleanup levels can not be achieved from the standpoint of the protection of human health and the environment with on-site treatment, contaminated material must be excavated and hauled to a site to be treated and buried. The reason other technologies do not achieve an acceptably low residual level of contamination in the processed material is often because contaminants from deep within the material particulates is not removed. Over time, "clean" sites can be found to be contaminated because chemicals within processed material have migrated to the surface of the material particulates and are once again detected in analytical tests. The use of a high vacuum in the present invention provides the benefits of accelerating the overall separation process and maximizing the diffusion of volatile compounds from within the solid to the surface where they are rapidly vaporized and exhausted from the retort. The diffusion is maximized by the increased pressure gradient between the center of a particle and the surface of the particle. The contaminant within the particle vaporizes producing a high relative pressure inside the particle compared to the very low pressure at the surface of the particle. The present invention therefore accomplishes the goal of producing the lowest residual contamination levels achievable by efficiently removing contaminants from deep within the solid matrix.

Prior methods and apparatus for processing materials are disclosed in U.S. Letters Pat. Nos. 4,268,306; 5,183499; 5,244,492; and 5,300,137.

The present invention provides many advantages and eliminates several deficiencies found in the prior art thermal processing systems. As such, the invention meets a long-standing need to provide a novel thermal processing apparatus that 1) promotes the efficient separation of volatile and non-volatile substances, 2) promotes the efficient separation of volatile substances one from another and 3) promotes various chemical reactions through the use of a high throughput unit capable of mobile operation that a) reduces off-gas treatment requirements to the lowest practical levels achievable, b) produces the lowest practical residual contamination levels within the processed material, c) separates thermally sensitive substances and d) lowers the boiling point of substances to overcome temperature limitations imposed by the retort materials of construction. These improvements over prior art are accomplished by the combination of an externally or internally heated rotating vessel with or without an internal filter and blow back system operating under a vacuum of greater than one inch of mercury.

SUMMARY OF THE INVENTION

The present invention provides an apparatus for the separation of volatile from non-volatile substances, separation of volatile substances, one from the other, and for performing various chemical reactions by providing an apparatus, capable of being configured for mobile operation, that utilizes an application of above ambient temperature and above one inch of mercury vacuum in a rotating vessel. This apparatus reduces particulate and sweep gases to negligible amounts and thus, drastically reduces the need for the large and expensive off-gas processing systems found in the prior art. The present apparatus achieves this through the use of a vacuum above one inch of mercury and a uniquely designed rotatable seal and seal arrangement in combination with an internal filter that effectively eliminates particulates from escaping the retort.

The present invention combines a vacuum of above one inch of mercury with an externally or internally heated rotating retort, which through the use of an internal filter and seal arrangement, prevents air leakage into the retort and produces an apparatus that virtually eliminate carry out of particulates and minimizes the introduction of unwanted gases into the retort and, thus, into the off-gas treatment system. In addition, the vacuum of the present invention lowers the boiling point of many volatile compounds so that it efficiently processes substances that would normally be untreatable with current prior art indirectly fired thermal desorption units.

Importantly, the particulate carry out is virtually eliminated by a combination of a vacuum above one inch of mercury, low sweep gas volumes and an internal filter with a conventional blow back system to prevent clogging. This combination also maximizes the processing rate. The vacuum accelerates volatilization rates of compounds within materials such as soil particles by creating a pressure gradient between the center and surface of the particles. The contaminants, thus, diffuse faster out of the interior of the contaminated substances.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
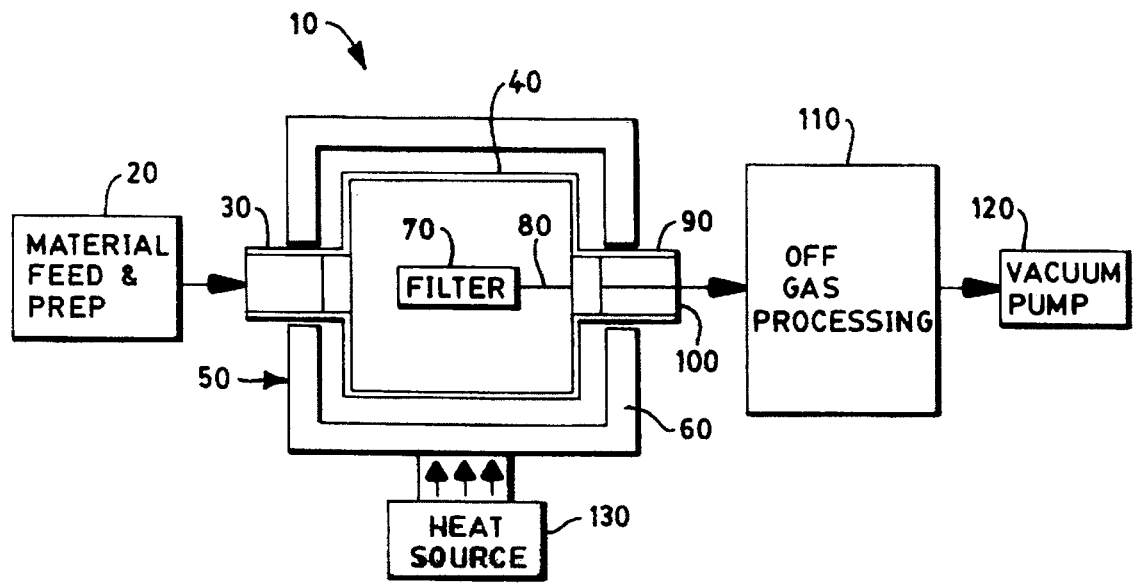
FIG. 1 is a schematic diagram illustrating one preferred embodiment of the apparatus of the present invention.

Turning now to FIG. 1, therein is disclosed the overall apparatus 10 of the present invention. The material 20 to be treated may use any suitable feed mechanism for its introduction into the retort 40. If necessary, the material 20 may be prepared using any number of conventional methods, such as crushing, sizing, screening, the addition of chemicals and/or other additives or shredding such that the material 20 is prepared and reduced to a size suitable of being fed through the first sleeve 30 of the apparatus 10 and being processed. As the material 20 is fed through the first sleeve 30, it feeds into the rotary vacuum thermal treatment vessel (retort) 40. The material 20 may be introduced into the retort 40 through the sleeve 30 by any suitable mechanism including an auger, pump or any other conveyance method. For example, to load larger materials 20, such as a metal pipe, the normal feed device can be replaced with a load port that allows the placement of larger pieces of material 20 into the retort. The material 20 can also be stacked in the retort 40.

Note that an insulated firebox 50 surrounds the retort 40. The firebox 50 may be constructed of any suitable material capable of supporting the insulation. In one embodiment, there is blanket insulating material 60 between the firebox 50 and the wall of the retort 40. The retort 40 may be constructed of any material capable of withstanding high temperature and vacuum. Preferably the retort 40 is constructed of materials that can withstand temperatures of 1100 degrees Celsius and vacuums of 29+inches of mercury. The retort 40 preferably has an internal filter 70 that is used in connection with the retort 40 to prevent particulates from entering the off-gas treatment system. The filter 70 (in at least one embodiment) is in the form of one or more sintered metal cylinders fitted with a conventional blow back system (not pictured) located inside the retort 40. The apparatus 10 can also be used, depending on the material to be processed and the operating parameters of the retort 40, without the internal filter 70.

In operation, the volatilized materials pass through a conduit 80 and exit the retort 40 through sleeve 90. Sleeve 90 has a seal 100 between the stationary off gas tube and the rotating conduit 80 that enables vacuum to be maintained. Once exited from the retort 40, the volatilized material is directed to any of a number of suitable off-gas treatment systems 110 for further processing or discharge to the atmosphere. A vacuum pump 120 is used to maintain a suitable vacuum within the retort 40 while in use. Off-gas processing can be performed at ambient pressure or vacuum, depending on vacuum pump placement.

In operation, heat from a heat source 130 is applied to the retort 40 indirectly through the use of the firebox 50 and insulation material 60. The heat source 130 can be any conventional type heat source and can use any conventional fuel that will produce the proper temperatures and necessary transfer of heat into the retort 40. For example, the heat source 130 may be from burning fossil fuels, resistance heaters, infrared heaters and microwave heaters or any of a number of conventional means. Alternately, resistance, infrared or microwave heaters may be mounted inside the retort 40 with the retort unlined or lined on the inside with refractory material or insulated on the outside with material capable of withstanding high temperature. Preferably, at all times during the operation of the apparatus 10, the vacuum pump 120 is utilized to establish and maintain a vacuum within the retort 40 of from 1 to 29+inches of mercury.

After treatment in the apparatus 10, the volatilized and gaseous materials can go through many types of off-gas treatment systems 110 including conventional separators, gas/gas phase reactors, condensers, scrubbers, absorption/adsorption beds, catalytic reactors and direct release to the atmosphere.

Figure 2:
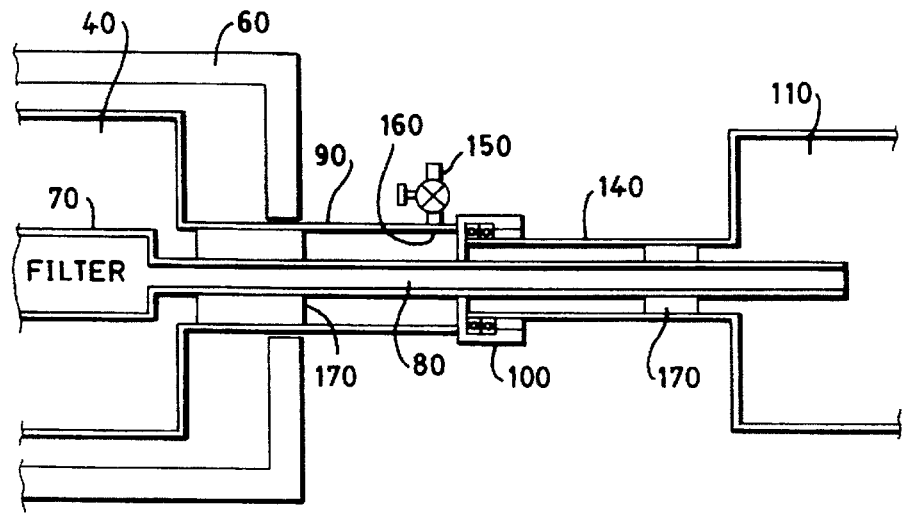
FIG. 2 is a longitudinal cross-section of one embodiment of the seal assembly of the apparatus of the present invention.

Turning now to FIG. 2, therein is further described one preferred embodiment of the sleeve 90 utilized in connection with the present invention. Note that the vaporized and gaseous materials pass through the conduit 80 as it exits out of the retort 40 to the off-gas treatment system 110. The vaporized and gaseous materials flow through the filter 70. The conduit 80 also attaches to a rotating vacuum seal 100 and external non-rotating pipe coupling 140.

Also shown in FIG. 2 is a purge or process gas flow control device 150. The use of the purge gas 160, which may be air, performs two functions: first, it helps to maintain the temperature of the outer sleeve 90 near that of ambient air. Second, it helps to prevent the entry of process off-gases, which in turn prevents contaminant condensate from building up inside the sleeve 90. In addition, the very slight pressure gradient caused by the purge gas helps to prevent particulates from entering the sleeve 90.

Importantly, the design of the seal also reduces the amount of purge gas required to assist the movement of volatilized and gaseous substances out of the retort 40. In addition, the high vacuum increases the rate of diffusion of the gases and vapors from an area of higher concentration within the retort 40 to an area of lower concentration in the off-gas treatment system 110.

The use of the seal 100 allows the rotating retort 40 to be properly sealed at high temperatures, even though the retort 40 dimensions are changing due to expansion. Importantly, due to the ability of the purge gas and rotating tube within a tube system of the present invention to keep the seal 100 retort 40 interface cool, commercially available elastomer seals can be utilized. One of the disadvantages of the prior art is that most conventional seals can only withstand temperatures up to approximately 300 to 400 degrees Fahrenheit, which is far less than the 1600 to 1900 degrees Fahrenheit temperatures generated within the retort 40. While high temperature seals are currently being developed, they are far more expensive than those used in the present invention.

In addition, note that there are thermal plugs 170 that also assist in maintaining the temperature differential between the retort 40 and sleeve 90 and between the sleeve 140 and the off-gas treatment system 110.

Figure 3:
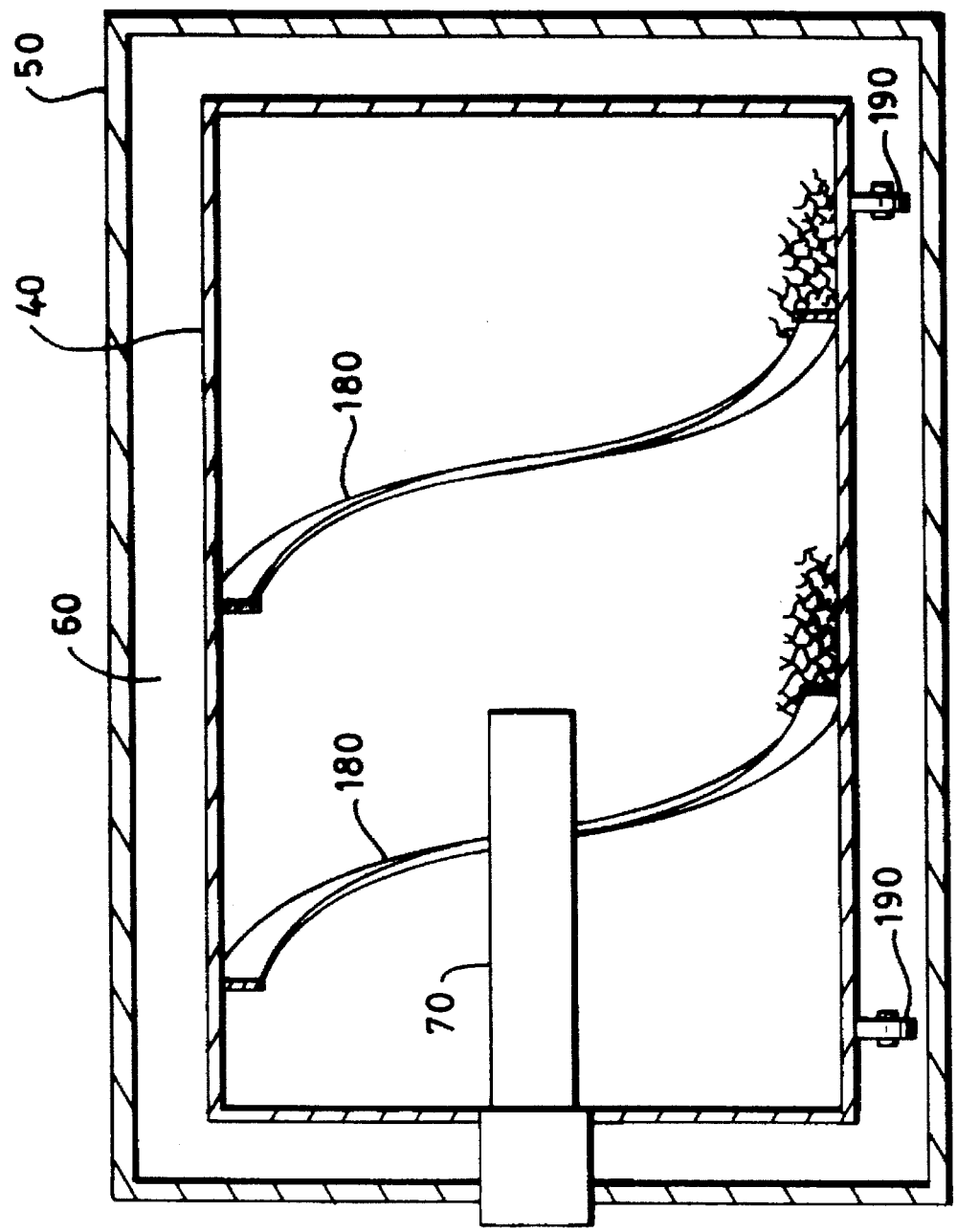
FIG. 3 is a longitudinal cross-section of one of the preferred embodiment of the retort of the present invention.

Now turning to FIG. 3, in one embodiment of the apparatus 10, the retort 40 is a cylindrical vessel that has internal flights or spirals and lifters 180. Support rollers 190 are also used in connection with the retort 40 so that it is easily rotatable within the firebox 50. Once a vacuum has been established by the vacuum pump 120, the retort 40 is set into rotation by a suitable drive motor and gearing system (not shown). The placement of the flights and lifters 180 along the interior wall of the retort 40 acts to enhance the heat transfer from the retort 40 to the material 20 to be processed. The rotation of the retort 40 and the use of the flights and lifters 180 also enhances the surface area of the material 20 exposed to the vacuum by inducing a cascading and/or rolling of the material thereby minimizing the path length required for the vapors and gases to exit the retort 40 and also minimizing the interferences caused by interactions between vapor molecules and particulates during the movement of the vapor out of the retort.

The use of the flights and lifters 180 also allows filling of the retort 40 to a greater bed depth than traditional retorts, thereby increasing throughput. The fast removal of the volatilized substances from the retort 40 minimizes the degree of thermal decomposition occurring within the retort 40, resulting in a more defined off-gas stream and simpler design of the off-gas treatment system 110.

Chains, steel balls or other devices can be used inside the retort 40 to further reduce particle size during processing. The interior of the retort 40 preferably contains a sintered metal filter 70 capable of continuous service under the conditions created within the retort 40. All gases exiting the retort 40 pass through the filter 70 which acts to prevent particulates from entering the off-gas treatment system 110. Typically, the filter 70 is mounted coaxially or offset in the upper third of the retort 40 and may or may not rotate within the retort.

Note that the apparatus 10 may be placed on trailers or railcars or unloaded and assembled at any site where material is to be processed. Although the process as described in this patent is a batch process, it can also be used in a continuous feed mode. In addition, chemical reactions can be performed by using the apparatus 10 to create the necessary thermal and atmospheric conditions within the retort 40.

Moreover, the apparatus 10 of the present invention is particularly useful for volume reducing radioactive materials through the use of the retort 40 for removing free water and waters of hydration, separating non-radioactive volatile substances from radioactive non-volatile substances such as organic ion exchange resins from radioactive metallic isotopes and decomposing non-radioactive solids into one or more gases such as converting non-radioactive calcium carbonate used in nuclear reactor wastewater treatment into calcium oxide and carbon dioxide.

Although the invention has been described in detail, it is to be clearly understood that the same is by way of illustration and example only and is not to be construed as limitations. The spirit and scope of the invention is limited only to the terms of the appended claims.

We claim:

1. A chemical processing and reaction apparatus for the separation of volatile from non-volatile substances and volatile substances, one from the other, comprising:

an outer shell;

a vacuum thermal treatment vessel rotatably disposed within the outer shell;

a rotatable sleeve and seal arrangement connected to at least one end of the vessel;

means for transporting material to be processed into the vessel;

an internal filter disposed within the vessel;

means for transporting volatile substances out of the vessel attached to the internal filter;

means for rotating the vessel;

means for cooling the rotatable sleeve and seal arrangement:

means for establishing and maintaining a vacuum pressure within the vessel between 1 and 29 inches of mercury, thereby lowering the boiling point of volatile substances during operation of the apparatus; and means for heating the vessel to a temperature sufficient to vaporize volatile substances.

2. An apparatus in accordance with claim 1 further comprising:

a plurality of thermal plugs connected to both ends of the vessel for assisting in the prevention of condensate buildup and for assisting in maintaining the temperature differential between the vessel and the rotatable sleeve and seal arrangement.

3. The apparatus in accordance with claim 1 wherein the means for transporting material to be processed into the vessel is a conventional auger.

4. The apparatus in accordance with claim 1 wherein the internal filter is a sintered metal filter.

5. The apparatus in accordance with claim 1 further comprising a plurality of lifts within the interior of the vessel for enhancing the heat transfer from the vessel walls to the material to be processed and for enhancing the surface area of the material to be processed exposed to the vacuum by inducing cascading and rolling of the substance.

6. The apparatus in accordance with claim 1 wherein the means for transporting volatile substances further comprise a conduit attached to the rotatable sleeve and seal arrangement and an external pipe coupling.

7. The apparatus in accordance with claim 1 further comprising an off-gas treatment system operably connected to the means for transporting volatile substances out of the vessel.

8. The apparatus as recited in claim 1 wherein the means for heating the vessel produces heat up to 1100 degrees Celsius.

9. The apparatus as recited in claim 1 further comprising an insulation blanket disposed between the outer shell and the vessel.

10. The apparatus as recited in claim 1 wherein the means for cooling includes a purge gas flow control device connected to the rotatable sleeve and seal arrangement for allowing purge gas to flow into the vessel, for maintaining the temperature of the rotatable sleeve and seal arrangement near that of ambient air and for preventing the entry of process off-gases which prevents contaminant condensate from accumulating within the rotatable sleeve and seal arrangement.

11. An apparatus for processing materials to separate volatile substances from non-volatile substances and to separate volatile substances from one another, comprising:

an outer shell;

a vacuum thermal treatment vessel rotatably disposed within the outer shell, the vessel rotatable about an axis of rotation;

a first sleeve for receiving the materials to be processed, the first sleeve is rotatable about the axis and extends outwardly from the vessel through the outer shell;

a second sleeve rotatable about the axis and extending outwardly from the vessel through the outer shell, on the end opposite the first sleeve;

a rotatable vacuum seal attached to the second sleeve on the end extending outwardly from the vessel;

means for rotating the vessel within the outer shell about the axis;

an exhaust conduit for transporting volatile substances out of the vessel, the exhaust conduit outwardly extending from within the vessel through the second sleeve along the axis;

a vacuum pump operably associated with the exhaust conduit for producing a vacuum pressure within the vessel between 1 and 29 inches of mercury, thereby lowering the boiling point of volatile substances;

means for heating the vessel to a temperature sufficient to vaporize the volatile substances in the materials; and means for cooling the second sleeve and the rotatable vacuum seal.

12. The apparatus as recited in claim 11 further including a filter disposed within the vessel and attached to the exhaust conduit.

13. The apparatus as recited in claim 11 further including at least one lifter securably attached within the vessel for enhancing heat transfer from the vessel to the materials and for agitating the materials to enhance processing.

14. The apparatus as recited in claim 11 wherein the means for cooling includes a purge gas flow control device connected to the second sleeve between the vessel and the rotatable vacuum seal for allowing the flow of purge gas through the second sleeve into the vessel, thereby minimizing the heat expansion of the second sleeve so that the rotatable vacuum seal maintains an adequate seal.

15. The apparatus as recited in claim 11 further including support rollers disposed between the vessel and the outer shell.

16. The apparatus as recited in claim 11 further including a rotatable vacuum seal attached to the first sleeve on the end extending outwardly from the vessel.

17. The apparatus as recited in claim 11 further including an off-gas treatment system operably connected to the exhaust conduit.

18. The apparatus as recited in claim 11 wherein the means for heating the vessel produces heat up to 1100 degrees Celsius.

19. The apparatus as recited in claim 11 further including thermal packing disposed within the second sleeve between the vessel and the rotatable vacuum seal for providing a thermal seal between the vessel and the rotatable vacuum seal.

20. An apparatus for processing materials to separate volatile substances from non-volatile substances and to separate volatile substances from one another, comprising:

an outer shell;

a vacuum thermal treatment vessel rotatably disposed within the outer shell, the vessel rotatable about an axis of rotation:

a first sleeve for receiving the materials to be processed, the first sleeve is rotatable about the axis and extends outwardly from the vessel through the outer shell;

a second sleeve rotatable about the axis and extending outwardly from the vessel through the outer shell, on the end opposite the first sleeve;

a rotatable vacuum seal attached to the second sleeve on the end extending outwardly from the vessel;

means for rotating the vessel within the outer shell about the axis;

an exhaust conduit for transporting volatile substances out of the vessel, the exhaust conduit outwardly extending from within the vessel through the second sleeve along the axis;

a vacuum pump operably associated with the exhaust conduit for producing a vacuum pressure within the vessel between 1 and 29 inches of mercury, thereby lowering the boiling point of volatile substances;

means for heating the vessel to a temperature between about 500 and 1100 degrees Celsius; and means for cooling the second sleeve and the rotatable vacuum seal.

* * * * *